Figure 1:
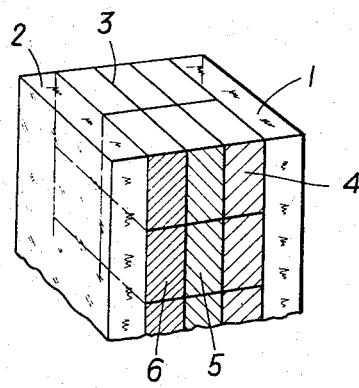

United States Patent [19]
von Belvard et al.

[11] 3,724,349
[45] Apr. 3, 1973

[54] VIEWFINDER

[75] Inventors: Peter Revy von Belvard; Robert Scheiber, both of Vienna, Austria

[73] Assignees: Karl Vockenhuber; Raimund Hausen, both of Vienna, Austria

[22] Filed: Apr. 14, 1972

[21] Appl. No.: 244,178

[30] Foreign Application Priority Data

Apr. 29, 1971 Austria.....................................3683

[52] U.S. Cl.................................95/44 R, 250/213
[51] Int. Cl............................G03b 3/08, H01j 31/50
[58] Field of Search..............95/44 R, 44 C; 250/213

[56] References Cited

UNITED STATES PATENTS

| | | | |
|---|---|---|---|
| 3,300,645 | 1/1967 | Winslow | 250/213 |
| 3,571,598 | 3/1971 | Lombard | 95/44 X |
| 3,629,591 | 12/1971 | McNeill | 250/213 |

*Primary Examiner*—Samuel S. Matthews
*Assistant Examiner*—Michael L. Gellner
*Attorney*—Ernest G. Montague

[57] ABSTRACT

In an optical system an objective defining an optical axis and at least one image plane, the objective forming a real image of an object in the image plane. A device is provided for varying the contrasts of said image. The means is arranged on the optical axis and comprises a plurality of photoelectric receivers arranged in at least one plane within the range of the image plane. The photoelectric receivers have a non-linear characteristic and have an output, the value of which varies in dependence on the sharpness of the real image in the plane of the photoelectric receivers, the value assuming an extreme with coincidence of the image plane and the plane of the photoelectric receivers. A layer of a plurality of electrooptic transducers is provided, each of the transducers being connectable with a corresponding receiver. Each of the transducers is associated to the other transducers in the same configuration as the corresponding receiver with respect to the other receivers to form an image corresponding to the real image, but having contrasts varied in dependence on the depth of field of the objective.

21 Claims, 4 Drawing Figures

VIEWFINDER

The invention relates to a viewfinder, preferably a camera viewfinder, with an objective for producing a real image of an object, which image may be contemplated by interposing further optical means.

While contemplating an object through a viewfinder system, it appears to be especially advantageous, if the objects focused by the objective contrast very sharply, whereas blurred objects remain dark. Such effects however could not be attained with the arrangements known hitherto.

According to the invention it is suggested to provide in the path of rays of the viewfinder a viewing screen for front or rear light, showing contrast amplifying means, as known per se, said contrast amplifying means being provided with a photoelectric transducer covering or filling out, respectively, the surface of the screen, preferably a known optical image amplifier, built up by a transparent, photoelectric transducer layer, preferably a photo-semiconductor layer and an electrooptic transducer layer formed by a liquid crystal, e.g. a nematic crystal and being conductively connected with said photo-semiconductor layer, the characteristic of which being nonlinear, for instance logarithmic, and that for the variation of the working point of the photoelectric-optical transducer a resistor is connected in series therewith, which may be adjusted by means of at least one control means provided for instance in a cinematographic camera, in case by means of an operating handle.

Thus all the optical signals striking the viewing screen are first converted into electric signals, of which the control may be easily performed, whereupon these electric signals are again reconverted into optical ones. Only due to the fact that this photoelectrical-optical transducer shows a nonlinear characteristic, a variation of the image contrast becomes possible. Here it may be remarked that a photoelectrical-optical transducer, namely an optical image amplifier, has become known from the Austrian Pat. specification No. 194,925. However there is no reference made in this publication as to the adaptability for a viewing screen, as suggested by the present invention among other things.

Using an optical image amplifier, of which the electrooptic transducer layer is formed by an electro-luminescence, one has the possibility to amplify the brightness of the image, but on the other hand one has to put up with the image only appearing in black-and-white shades. If on the contrary the contrast of a colored image is to be adjusted, it is advantageous if the photoelectric transducer layer is transparent, preferably a photo-semiconductor layer, and the electrooptic layer is formed by a liquid crystal, e.g. a nematic crystal, as it has been suggested in the German DOS 2 018 235. There results the special advantage that such a nematic crystal not only changes its capacity of transparency, but also the reflection in dependence on the applied voltage, so that such a viewing screen is adapted as well for front light, as for rear light. Moreover the construction of such a screen may be much simpler than that of a known optical image amplifier. For the variation of the working point of the photoelectric-optical transducer it is expedient within the scope of the invention to connect in series a preferably adjustable resistor, to which in case an operating handle may be connected. By means of the resistor connected in series the contrast may be adjusted, whereby in the case this resistor would be adjustable by means of an operating handle, a control also after the assembly of the screen could take place.

Another possibility consists in the utilization of the viewing screen in the path of rays of the viewfinder for an optical exposure control. If the working point of the screen is correctly chosen, all of the parts of the image sufficiently illuminated will appear very bright, whereas the poorly illuminated objects will remain dark. In any case the user of the camera gets on the screen an increased representation of the conditions on the shot. The optical proportions must be chosen according to the use of the screen either for focusing or for exposure measuring. Upon use for exposure measuring it will for example be advantageous to arrange the screen so that the variations in distance setting of the objective do not affect the image. After all the user of the camera does not care for the way of setting, but it is only essential for him that his shots turn out as desired. Therefore a special interest is taken in a viewfinder arrangement showing the viewfinder image precisely as the shot will turn out at the given setting. This may be achieved according to an advanced development of the invention, in that the adjustable resistor is controlled by a depth of field computer, whereby at least the photoelectric transducer layer shows a nonlinear characteristic. The special development of the depth of field computer is of no importance for the invention and it may in this connection only be referred to a computer as set forth in the Austrian Pat. specification No. 280,779. In order to eliminate the influence of illumination as far as possible, it will be advantageous to provide in front of the photoelectric-optical transducer an aperture stop controlled by an exposure control, preferably one that sets the objects to a steady brightness. That ensures that the object brightness on the screen does not result from its illumination, but from a correct focusing.

Should however the viewing screen be used for an optical, that means subjective exposure measuring, it will be expedient to control the adjustable resistor by means of an arrangement for exposure measuring, whereby preferably at least the electrooptic transducer layer shows a nonlinear characteristic.

Further details of the invention will become apparent from the following specification of the embodiments schematically illustrated in the drawing.

Figure 2:
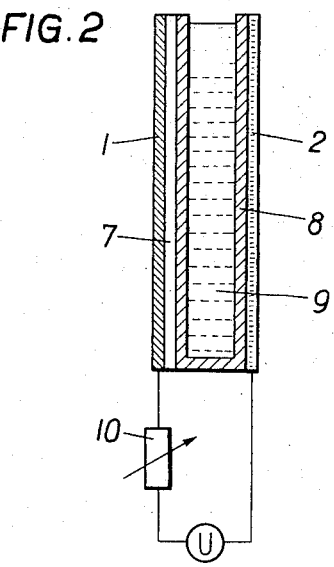
Figure 3:
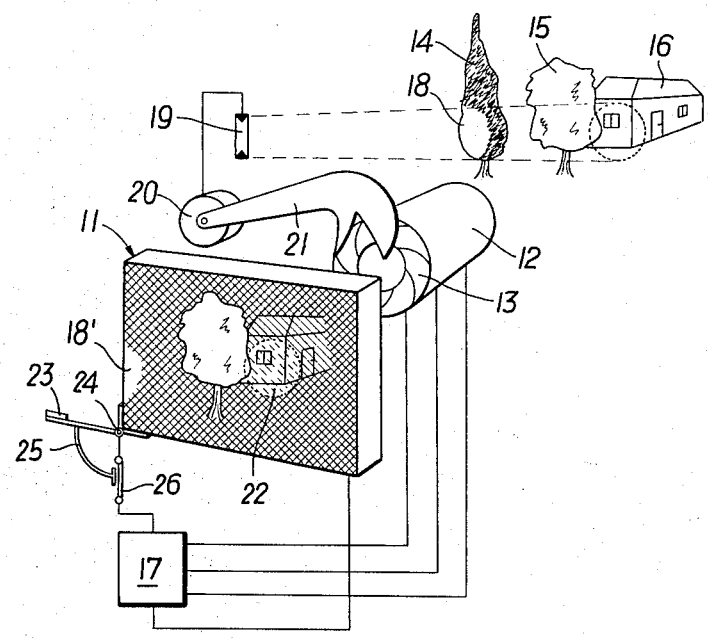
Figure 4:
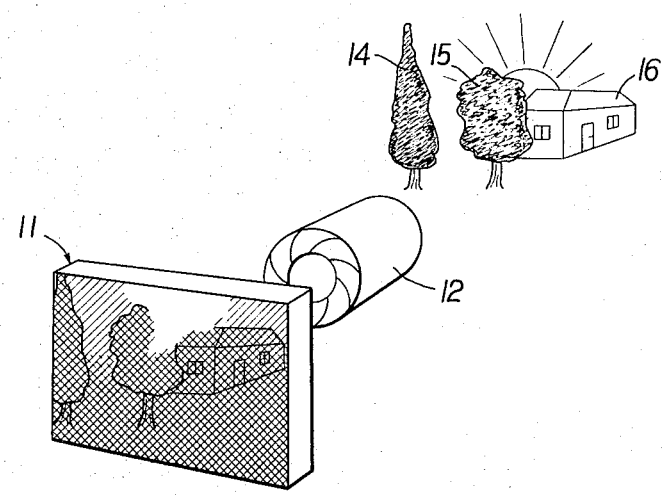

FIG. 1 shows a cross-section of a known image amplifier,

FIG. 2 schematically displays a most advantageous embodiment of a photoelectric-optical transducer and FIGS. 3 and 4 show the use of such transducers in a camera.

A known photoelectric-optical transducer shows between two transparent electrodes 1, 2 a honeycombed member 3 of plastic material for instance. The honeycombs of this member 3 are constructed as continuous holes, whereby the holes have an optical shape. The honeycombs of this member 3 so form a fine raster for the image. Inside of each honeycomb of the member 3 there is provided a photoelectric transducer layer 4 on one side, which in dependence on the incident light produces an output signal over the transparent electrode 1. This output signal is fed to an electrooptic transducer layer 6 facing the other transparent electrode 2 by means of a conductive layer that may be available. In accordance with the fed voltage, a larger or smaller optical signal is produced in each of the honeycombs, whereby the sum of all the signals reproduces the image received. If now such a transducer is developed as a viewing screen, showing a nonlinear characteristic, e.g. a logarithmic characteristic for the setting of a certain contrast, the screen may like this be used as rear light screen, whereby the image contrast may be selected. This arrangement is applicable for cinematographic rear projection as well as for television. In that way also the suppression of background noises in transmission may be attained.

Though the transducer illustrated in FIG. 1 offers some advantages due to the possibility of amplifying the brightness, it may for certain purposes appear as a disadvantage that only black-and-white pictures are obtainable. Beyond that the manufacture of such a transducer in an adequate fineness as to the image point pitch is rather difficult. However these disadvantages are avoided by the construction according to FIG. 2. Here again two transparent electrodes 1, 2 are used, whereby in the electrode 1 there is provided for instance a photo-semiconductor layer 7. This layer 7 is likewise transparent. In a container 8 there is further provided a liquid crystal, e.g. a nematic crystal 9. If now an image is projected over the transparent electrode 1 on the layer 7, local charge patterns appear on this layer, which correspond to the projected image. These local charge patterns cause likewise locally a variation of the direction of the liquid 9, whereby its light transparency or reflection, respectively, is changed. If now the illustrated transducer has a nonlinear characteristic, the image is reproduced with increased contrast on the side of the electrode 2, that is to say, bright spots remain bright, whereas dark spots become more dark. In order to vary the working point of the transducer connected with a voltage source U, there is provided a series resistor, which either is preadjusted or is adjustable by means of an operating handle. The photoelectric-optical transducer illustrated in FIG. 2 is relatively simpler in manufacture than a transducer with a honey-combed member 3 according to FIG. 1. Moreover it offers the advantage that colored pictures may be reproduced on the screen. Beyond that a screen developed as described before is adapted as well for rear light as for front light, since not only the light transparency, but also the reflection changes in accordance with the applied voltage.

The screens find a special range of application in camera viewfinders. In this case the sighted scene is shown in increased representation on the screen, just as it will become visible later on on the shot. In FIG. 3 this is illustrated for the purpose of depth of field determination. Here an inventive screen is arranged behind the objective 12 in the path of rays of the viewfinder of a camera. The objective 12 may be the objective of the camera itself and a part of the rays is projected from the path of rays of said objective on the screen 11. The screen 11 is situated in a plane conjugated to the image plane of the objective 12. The objective may for instance be a zoom lens, the depth of field range of which is determined by the aperture of the diaphragm 13, by the distance setting and by the setting of the focal length. The screen 11 is developed so that the photoelectric transducer layer 4 and 7, respectively, already shows for itself a nonlinear characteristic. It is known that photoelectric transducers of the kind produce a special large output signal, if the image projected on their surface is sharp. This effect is now utilized in that a scene, which for instance consists of trees 14, 15 and of a house 16 essentially extending parallelly to the optical axis of the objective 12, is reproduced on the screen 11 so that all of the focused objects, also the tree 15 in FIG. 3, are brightly and distinctly recognizable, whereas the unsharp objects show a much reduced brightness. It is to be seen on the screen 11 that while the focused tree 15 is distinctly visible, the house 16 of which the front face lies on the limit of the depth of field, is no more recognizable towards its rear end. However with an adjustment of the objective 12 changing the depth of field, the image on the screen changes in accordance therewith.

In order to adapt the depth of field displayed on the screen 11 to the data with respect to the setting of the objective 12, its setting devices may additionally be connected with a depth of field computer 17, which lies in the circuit instead of the series resistor 10 (FIG. 2) and determines the working point of the photoelectric-optical transducer. Thus the contrast is changed within a wider range in dependence on the given depth of field. The setting of the working point corresponds thereby practically to the setting of a threshold value.

Of course also the brightness of the illumination of the scene is taken up in the image reproduced by the screen 11. The tree 14 lying outside the depth of field range shows for instance a highly illuminated spot 18, which correspondingly appears on the screen as a bright spot 18'. However it is to be seen that such a bright spot cannot be recognized as a focused object, so that mistakes are nearly impossible.

In order to eliminate as far as possible the influence of the illumination, a photo cell 19 may be provided, which performs a measuring of the object brightness. Instruments of the kind for measuring the object brightness are incorporated in some cameras in order to enable to measure at counterlight the brightness of the sighted object. An aperture stop 21 lying in the path of rays of the viewfinder is connected with this cell 19 by means of a motor 2o, and adjusts to the same object brightness. A circular mark 22 on the screen designates the object to be sighted, the rightness of which is measured by the photocell 19. In this way it may easily be recognized, whether the sighted object lies within the set depth of field. Another possibility to eliminate the influence of the illumination is to use a construction with photoelectric receivers in two planes, as it is known from U.S. Pat. specification No. 3,493,764.

In case it may be desirable to remove the screen 11 from the path of rays of the viewfinder. For this purpose there is provided a schematically indicated key 23, which upon operation pivots the screen 11 round an axis 24. Simultaneously an interrupter 26 situated in the circuit is opened by means of a push rod 25.

Though the use of the screen 11 is set forth in FIG. 3 in connection with the calculation of the depth of field, it is clear that it is also adapted for focusing in the same way. For the rest it is also conceivable to use the screen 11 for a subjective exposure measuring. In this case there is provided a resistor connected with the exposure control, for instance a photoresistor, instead of the computer 17 or the series resistor 1o. In order to get an impression of the exposure of a shot, it will be advisable to possibly choose a linear characteristic of the photoelectric transducer layer, so as to suppress the effect set forth above making the focused objects particularly contrasting. At least however, the optical arrangement or the objective, respectively, should be chosen so that a most high depth of field should be maintained on the screen, so that it would not influence the image. It is however more expedient, if the electrooptic transducer layer itself shows a nonlinear characteristic, so that in increased representation all bright objects are bright, whereas the dark objects are especially dark. In this way the attention of the user of a camera is drastically drawn to occurring exposure errors.

Such an embodiment in simplified form is illustrated in FIG. 4, in which a counterlight scene is reproduced on the screen 11. It is distinctly recognizable how the outlines of the dark surfaces of the house and of the tree standing by flow into each other, whereby some sunbeams from above disturb the outline. By adjusting the diaphragm of the objective 12, the image on the screen 11 may in case be so corrected that all the objects of the scene are perfectly reproduced on the screen.

The screen 11 may then be designed according to FIGS. 1 to 3; in the simplest case the photoelectric transducer layer may be formed by a layer of photo cells, so that no current supply over the electrodes occur.

What is claimed is:

1. In an optical system
    an objective defining an optical axis and at least one image plane, said objective forming a real image of an object in said image plane;
    means for varying the contrasts of said image, said means being arranged on said optical axis and comprising: a plurality of photoelectric receivers arranged in at least one plane within the range of said image plane, said photoelectric receivers having a nonlinear characteristic and having an output, the value of which varies in dependence on the sharpness of said real image in the plane of said photoelectric receivers, said value assuming an extreme with coincidence of said image plane and said plane of the photoelectric receivers;
    a layer of a plurality of electrooptic transducers, each of said transducers being connectable with a corresponding receiver, each of said transducers being associated to the other transducers in the same configuration as the corresponding receiver with respect to the other receivers to form an image corresponding to said real image, but having contrasts varied in dependence on the depth of field of said objective.

2. An optical system as set forth in claim 1 further comprising:
    a network electrically connected with said means for varying contrasts and having a variable output;
    control means connected with said network to control said output of said network.

3. An optical system as set forth in claim 2, wherein said control means are manually operable.

4. An optical system as set forth in claim 1, wherein said layer of electrooptic transducers comprise a liquid crystal.

5. An optical system as set forth in claim 4, wherein said liquid crystal is a nematic crystal.

6. An optical system as set forth in claim 1, further comprising adjustable diaphragm means arranged within a diaphragm plane of said objective.

7. An optical system as set forth in claim 6, further comprising further photoelectric transducer means having an output depending only on the brightness of said object, automatic diaphragm control means connected with said diaphragm means and being controlled by the output of said further photoelectric transducer means.

8. An optical system as set forth in claim 1, being incorporated in a camera.

9. An optical system as set forth in claim 8, forming at least part of the viewfinder system of said camera.

10. An optical system as set forth in claim 1, further comprising operating means connected with said means for varying contrasts to move the same from a first position outside the range of said optical axis to a second position on said optical axis.

11. An optical system as set forth in claim 10, further comprising a circuit electrically connected with said means for varying contrasts;
    interrupter means within said circuit, said interrupter means being connected with said operating means and having an open and a closed position, with said means for varying contrasts in said first position said interrupter means being in said open position and vice-versa.

12. In an optical system
    an objective defining an optical axis and at least one image plane, said objective being adapted to form a real image of an object in said image plane;
    means for varying contrasts of said image, said means being arranged on said optical axis and comprising:
    a plurality of photoelectric receivers arranged within said image plane, said photoelectric receivers having an output, the value of which varies in dependence on the brightness of said real image;
    a layer of a plurality of electrooptic transducers, each of said transducers being connectable with a corresponding receiver, said transducers having a nonlinear characteristic, each of said transducers being associated to the other transducers in the same configuration as the corresponding receiver with respect to the other receivers to form an image corresponding to said real image, but having intensified contrasts.

13. An optical system as set forth in claim 12, further comprising:
    a network electrically connected with said means for varying contrasts and having a variable output;
    control means connected with said network to control said output of said network.

14. An optical system as set forth in claim 13, wherein said control means are manually operable.

15. An optical system as set forth in claim 12, wherein said layer of electrooptic transducers comprise a liquid crystal.

16. An optical system as set forth in claim 15, wherein said liquid crystal is a nematic crystal.

17. An optical system as set forth in claim 12, further comprising adjustable diaphragm means arranged within a diaphragm plane of said objective.

18. An optical system as set forth in claim 12, being incorporated in a camera.

19. An optical system as set forth in claim 18, forming at least part of the viewfinder system of said camera.

20. An optical system as set forth in claim 12, further comprising:

operating means connected with said means for varying contrasts to move the same from a first position outside the range of said optical axis to a second position on said optical axis.

21. An optical system as set forth in claim 20, further comprising:

a circuit electrically connected with said means for varying contrasts;

interrupter means within said circuit, said interrupter means being connected with said operating means and having an open and a closed position, with said means for varying contrasts in said first position, said interrupter means being in said open position and vice-versa.

\* \* \* \* \*